J. N. HARRISON & E. F. WILSON.
Pruning Implement.
No. 223,625. Patented Jan. 13, 1880.
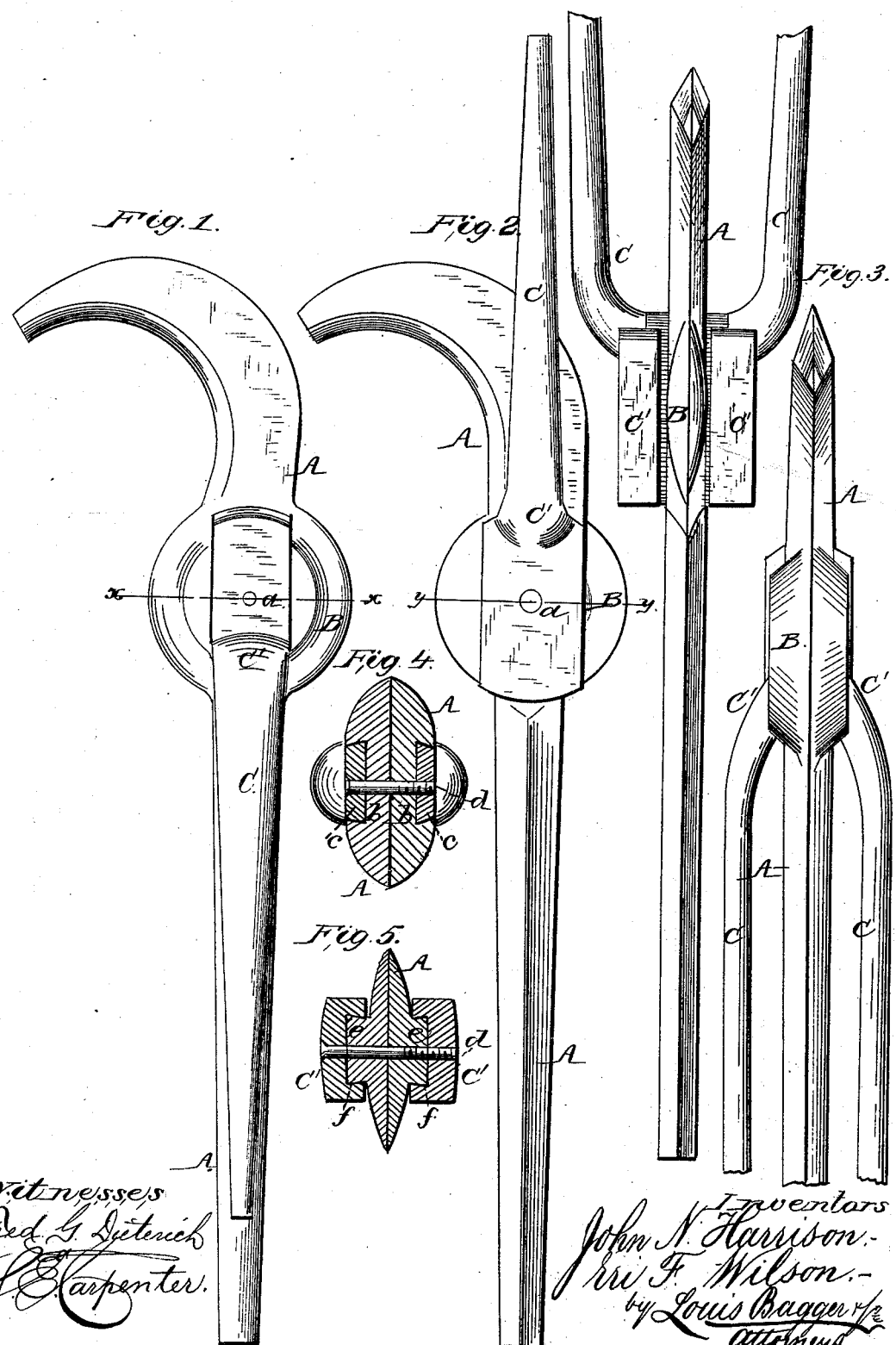

UNITED STATES PATENT OFFICE.

JOHN N. HARRISON AND ERI F. WILSON, OF ROCHESTER, NEW YORK; SAID HARRISON ASSIGNOR TO SAID WILSON.

PRUNING IMPLEMENT.

SPECIFICATION forming part of Letters Patent No. 223,625, dated January 13, 1880.

Application filed July 26, 1879.

*To all whom it may concern:*

Be it known that we, JOHN N. HARRISON and ERI F. WILSON, of Rochester, in the county of Monroe and State of New York, have invented certain new and useful Improvements in Pruning and Hedge-Trimming Shears; and we do hereby declare that the following is a full, clear, and exact description of the invention, which will enable others skilled in the art to which it appertains to make and use the same, reference being had to the accompanying drawings, which form a part of this specification, and in which—

Figure 1 is a side view of a pair of pruning and hedge-trimming shears embodying our improvement. Fig. 2 is a similar view, showing the handles reversed for hedge-trimming, and showing, also, a slight modification in the attachment of the reversible handles upon the blades. Fig. 3 is an edge view of the shear represented in Fig. 1. Fig. 4 is a cross-section on line $x\ x$ in Fig. 1, and Fig. 5 is a similar section taken on line $x\ x$ in Fig. 2.

Similar letters of reference indicate corresponding parts in all the figures.

This improvement relates to the combination, with a pair of pivoted cutting-blades, of a pair of detachable and reversible handles, whereby either end of the blades may be used, substantially as hereinafter more fully set forth.

In the drawings, A A are the blades, which are pivoted at $a$, and made preferably with one curved and one straight end, the ends being sharpened on both edges.

Each of the blades A is enlarged around its pivot $a$, as shown at B, so as to form a disk or plate, which greatly strengthens that part of the blades upon which the greatest strain comes in operating the shears. This enlarged blade-section B is not necessarily round, as in the drawings, inasmuch as it will answer the same purpose if made square or oval; but by preference we make it round, as being neater and more convenient than any other shape.

C C are the handles, which are curved at the upper end, C', where they are attached to the blades.

In the present illustration of our invention we have shown two methods of attachment of the handles upon the blades—viz., in Figs. 1 and 4.

The enlargement B upon each of the blades A A is provided with a longitudinal groove or recess, $b$, and the handles C C have a corresponding shoulder, $c$, fitting into the said groove or recess, which may be dovetailed to admit of the insertion endwise of a dovetailed shoulder, $c$, as shown in Fig. 4 of the drawings.

The recess $b$, as well as the shoulder $c$, being made with parallel sides, it follows that the handle can be inserted into its recess in the enlargement B from either end, so that either end of the blades may be used, the handles being held in place by a screw, catch, spring, or analogous fastening device, $d$. In Figs. 2 and 5 of the drawings this arrangement is reversed—*i. e.*, the enlargements B B have longitudinal raised parts or shoulders $e\ e$ and the ends C' C' of the handles have grooves or recesses $f\ f$, which fit upon the shoulders $e\ e$, as clearly shown in Fig. 5, and are held in place thereon detachably by a screw or catch, $d$.

It is obvious that the blades A A may be made with two straight ends, if preferred, instead of with one straight and one curved end, as shown in the drawings, or both ends may be curved in opposite direction, so as to form blades or cutters of an S shape, sharpened on both edges, so that when one end becomes dulled from use the other end may be used by simply detaching and reversing the handles in the manner described; but we prefer to use the style of blades shown in the drawings, the curved or hooked end of which, with the handles arranged as shown in Fig. 1, constitutes a convenient pruning-shear, while by reversing the handles, as shown in Fig. 2, the long straight ends of the blades come into play, constituting convenient hedge-trimming shears.

Having thus described our invention, we claim and desire to secure by Letters Patent of the United States—

The combination, with the shear-blades A A, pivoted at *a*, and provided with enlarged sections or circular disks B B around the pivotal point, recessed to receive the handle ends, of the detachable and reversible handles C C, substantially as set forth.

In testimony that we claim the foregoing as our own we have hereto affixed our signatures in presence of two witnesses.

JOHN N. HARRISON.
    ERI F. WILSON.

Witnesses:
  A. L. BARTON,
  E. H. DUNNING.